United States Patent Office 3,537,924
Patented Nov. 3, 1970

3,537,924
PERCHLORATE PREPARATION
Joseph J. Byrne, Boston, Mass., assignor to Monsanto Research Corporation, St. Louis, Mo., a corporation of Delaware
No Drawing. Filed July 2, 1962, Ser. No. 207,472
Int. Cl. C01b 11/18; C06c 1/02
U.S. Cl. 149—36                                            8 Claims This invention relates to hydrazine perchlorate, and more particularly, provides novel methods of preparing and handling hydrazine perchlorate materials under anhydrous conditions.

Hydrazine perchlorate is a desirable high energy oxidizer for propellant compositions used to drive rockets and the like. However, it is hazardous to handle. This perchlorate has a sensitivity to impact which is about the same as that of lead azide—about 3 to 6 centimeters (50% probability height, 2 kilogram weight, standard Bureau of Mines impact test apparatus).

Aqueous solutions have been used heretofore to prepare hydrazine perchlorate, by metathesis of a hydrazine salt of some other acid, such as the hydrochloride salt, with a metal perchlorate. This procedure, it is found, results in the production of the hemihydrate of the hydrazine perchlorate salt.

The eutectics of hydrazine perchlorate and lithium perchlorate (which correspond to the 1:1 and 1:2 molar ratio) have been found to be much less sensitive to impact than hydrazine perchlorate itself; their measured impact sensitivities are about 26–30 and 50 cm. respectively. This is true only of the eutectics, however. When the hydrazine perchlorate and lithium perchlorate are combined in a gross physical mixture in the same ratios as those of the eutectics, the impact value for the 1:2 molar ratio drops from about 50 to about 20 and that for the 1:1 molar ratio eutectic drops from about 25 to about 10.

The lithium perchlorate/hydrazine perchlorate eutectics are novel materials which can advantageously be employed for the manufacture of solid propellant compositions, as described and claimed in copending application S.N. 207,460 filed concurrently herewith by Stanley F. Bedell. One of the most commonly uses inorganic oxidants in solid propellant compositions is ammonium perchlorate. Employing a eutectic of lithium perchlorate and hydrazine perchlorate instead of the ammonium salt as the inorganic oxidant in propellant compositions affords several advantages. The heat of formation of the 1:1 eutectic is about 5 kilocalories more positive than ammonium perchlorate when compared on a 100 gram basis. Furthermore, besides the higher energy that it thus possesses, it has a highr density: 2.126 g./cc. (theoretical 2.127 g./cc.).

Preparation of the hydrazine perchlorate/lithium perchlorate eutectics can be effected by fusing the two perchlorate salts in a mixture of the proper proportions corresponding to the eutectic. To produce a eutectic having the above-stated impact sensitivity values, however, it is necessary to employ anhydrous perchlorates as starting materials. When the perchlorates employed are not anhydrous, the resulting products are more impact sensitive, because hydrated material will not enter into eutectic formation, and therefore the product deviates from the eutectic composition. Deviations from the eutectic composition increase the impact sensitivity.

As above mentioned, the product of hydrazine perchlorate formation in aqueous solution is the hemihydrate containing water of hydration. To produce the anhydrous salt required for the fusion with lithium perchlorate to form eutectics of the desired favorably diminished sensitivity, this water of hydration must be removed. Because of the great impact sensitivity of pure hydrazine perchlorate, the handling required to dehydrate the hemihydrate and then convert it to the euthectic is undesirably hazardous.

It is an object of this invention to provide novel methods of working hydrazine perchlorate, which reduce the hazards of such work.

A particular object of this invention is to provide a novel method of forming and handling hydrazine perchlorate in which the hydrazine perchlorate has reduced impact sensitivity.

A further particular object of this invention is to provide a novel method of forming a hydrazine perchlorate-containing product having less impact sensitivity than hydrazine perchlorate itself, in which it is never necessary to work with materials having dangerously low impact sensitivity values of 10 centimeters or below.

These and other objects will become evident from a consideration of the following specification and claims.

It has now been found that when hydrazine perchlorate is prepared by metathesis of a hydrazine salt with a perchlorate salt in an organic solvent system, so long as the hydrazine perchlorate is wet with the organic solvent, it has reduced impact sensitivity. Wetting the perchlorate salt with an organic solvent such as isopropanol, for example, raises the impact sensitivity value to 90–100 centimeters (cm.) as compared to the 6 cm. impact sensitivity of hydrazine perchlorate completely free of associated liquid.

Further, it has been found that the lithium perchlorate/hydrazine perchlorate 1:1 molar ratio eutectic can advantageously be prepared in an organic solvent system. The impact sensitivity of this eutectic is much less than that of hydrazine perchlorate, as above mentioned, and if the hydrazine perchlorate is prepared by the organic solvent system method of this invention and the resulting organic solvent solution of a hydrazine perchlorate is used for the preparation of the eutectic by addition of lithium perchlorate thereto in the correct amount, it is never necessary at any step in the process to isolate and handle a material with the hazardously great impact sensitivity of pure hydrazine perchlorate.

In general, hydrazine salts are not especially soluble in organic solvents, and therefore it would not have appeared to be advantageous to prepare the salt in an organic solvent rather than in aqueous solution, in which their solubility is high. However, the surprisingly great reduction in impact sensitivity which is found to be produced by wetting this salt with an alcohol or like organic solvent is such an advantage as to outweigh the possible inconvenience of dealing with a liquid reaction medium having relatively low solvent power.

Hydrazine perchlorate wet with an organic solvent to reduce its impact sensitivity in accordance with this invention can be handled with many less precautions and thus with much greater facility than dry hydrazine perchlorate, and accordingly it is adapted for use in any of a variety of operations wherein it is necessary to handle and work with this hazardous material. For example, when hydrazine perchlorate itself is to be employed in preparing a solid propellant composition, the hazards of operation in combining and milling the perchlorate salt into the polymeric binder which is combined with it to provide the propellant composition can be reduced by employing this technique. If desired, reduced pressure or the like can be applied to the resulting product to take off volatile solvent.

Also, the hydrazine perchlorate wet with the organic solvent can advantageously be employed in the preparation of lithium perchlorate/hydrazine perchlorate eutectic by fusion. Unlike the product of the aqueous method of forming this salt, the hydrazine perchlorate produced by the present method is free of any water of hydration and completely anhydrous. Thus deviations from the eutectic composition occurring as a result of the use of hydrated materials are avoided, and the precise eutectic composition, with minimum impact sensitivity, is readily achieved.

Still more advantageously, the eutectic will be produced by the solution technique of this invention. When the hydrazine perchlorate is made by metathesis of a hydrazine salt with another perchlorate in an organic solvent, the anion of the initial hydrazine salt and the cation of the initial perchlorate salt can be chosen so that they combine to produce an insoluble salt which precipitates from the solution, leaving hydrazine perchlorate in solution. This solution can then be separated from the precipitated byproduct salt, and lithium perchlorate added thereto to effect formation of the eutectic. Although chilling the solution to produce precipitation of the eutectic from a solution of the theoretical ratio does not produce a composition corresponding exactly to the eutectic, it is found that drawing off the solvent under reduced pressure does. It is important that the exact eutectic composition be achieved, for it is found that mixtures of lithium perchlorate and hydrazine perchlorate intimately associated by preparation of the mixture in the same manner as a eutectic, but in a different ratio, do not have the desirable impact sensitivities. Thus, a mixture of hydrazine perchlorate with lithium perchlorate in a 77/23 weight ratio, prepared in the same manner as the eutectic, detonates violently when subjected to a slight crushing force in a mortar and pestle.

When the hydrazine perchlorate/lithium perchlorate eutectics are formed by the fusion technique, the organic solvent is evaporated off during the heating to fusion temperature, so that appropriate techniques of safe handling should be observed. In the solution method, however, no product is ever isolated except the ultimate eutectic, either the 1:1 molar ratio or the 1:2 molar ratio, and neither of these has the very low impact insensitivity of hydrazine perchlorate itself, but instead have an impact sensitivity of at least about 25 or 50 cm. respectively (50% probability).

In practicing the method of the invention to form hydrazine perchlorate in an organic solvent, the hydrazine salt of an inorganic or organic acid will be associated in an organic solvent system with a metal salt of perchloric acid. Any of a wide variety of hydrazine salts may be employed in this connection. Thus for example, useful inorganic salts include the monohydrochloride and the dihydrochloride, the mono- and di-nitrates, the orthophosphate, the sulfates including hydrazine sulfate and dihydrazine sulfate, and the fluosilicate. Organic salts of hydrazine which may be used include the formate (hydrazine monoformate), the oxalate (dihydrazine oxalate), the maleate and so forth. A number of salts of hydrazine, including salts with substantially all of the major inorganic and low molecular weight organic acids, have been prepared and can be provided for use in the present reaction. However, for commercial purposes, salts with either hydrochloric or sulfuric acid will generally be preferred.

Similarly, any of a wide variety of perchlorate salts may be selected for reaction with the hydrazine salt, including for example sodium perchlorate, lithium perchlorate, potassium perchlorate, silver perchlorate, calcium perchlorate, strontium perchlorate, iron perchlorate and the like. The cation of the perchlorate selected should be a metal, and preferably one which will form an insoluble salt with the anion of the selected hydrazine salt. In this connection the perchlorates of the alkaline earth metals (including magnesium, calcium, strontium, and barium but not zinc and cadmium) are particularly preferred.

All of the salts of hydrazine with common inorganic and organic acids are practically insoluble in most common organic solvents. Hydrazine azide is, indeed, quite soluble in alcohol, but this must be excluded from the use in connection with the present invention because of its dangerously unstable character. In general, the organic solvents which do exhibit any degree of solvent power for the hydrazine salts are polar materials. For use in the present method, the solvent selected will advantageously be low boiling, especially where it is subsequently to be employed in making the eutectic and then removed by evaporation under reduced pressure. Accordingly, presently useful solvents include as a preferred group the polar low boiling solvents such as methyl, ethyl, isopropyl, butyl and amyl alcohols. The partial ethers of polyhydric alcohols, such as the monomethyl ether of ethylene glycol, the monomethyl ether of diethylene glycol and the like, and asymmetrical ethers such as ethyl butyl ether; esters such as ethyl acetate, isopropyl acetate, ethyl n-butyrate and the like; ketones such as acetone, methyl ethyl ketone and the like; and other polar potent solvents such as dimethylformamide and dimethylsulfoxide may also be employed as solvents, as may mixtures of different solvents such as a mixture of methyl and isopropyl alcohols.

The hydrazine salt and the metal perchlorate will be associated in the organic solvent in approximately equimolecular amounts, advantageously, so that the stoichiometry of the reaction will permit removal of the insoluble byproduct salt by filtration, leaving a filtrate comprising essentially only hydrazinium and perchlorate ions. The insolubility of barium chloride in lower aliphatic alcohols is such as to make it possible to reach yields of hydrazine perchlorate in excess of 90% of theoretical by this procedure. However, if the presence of impurities is not objectionable or steps are taken to remove foreign ions in the processing, of course the ratios of the reactants may vary from the stoichiometric. Because of the low solubility of hydrazine salts in organic solvents, generally a relatively high ratio of solvent to the hydrazine salt will be desirable. However, the lower aliphatic alcohols have a relatively good solvent power for hydrazine perchlorate, and an initially heterogeneous system, in which the hydrazine salt employed as starting material is not completely soluble, is also effective for practicing the present method; as product is formed, more of the starting material can go into solution. In general, the ratio of solvent to the reactants will range from somewhat less than necessary to dissolve all of the initial hydrazine salt to amounts which dissolve an appreciable but not a substantial amount of the byproduct salt.

The temperature of the reaction may range from below room temperature (but above the freezing point of the selected solvent) up to any temperature below the decomposition temperature of the reaction mixture components. Most advantageously, the reaction will be conducted at between ambient room temperature and the reflux temperature of the reaction mixture. The conditions used may include sub-atmospheric pressure down to say about 50 millimeters (mm.) Hg and superatmospheric pressure up to say about 5000 pounds per square inch (p.s.i.), but ordinarily simply stirring the reaction mixture compounds at about room temperature and pressure is most advantageous.

If the reactants are selected so that the byproduct salt is insoluble in the organic system, it will precipitate out as the reaction proceeds and can be removed by simple filtration. Other means of removing such byproduct can be employed if desired, such as addition of a silver salt to precipitate chloride ion or the like. The resulting solution of hydrazinium ions and perchlorate ions, desirably substantially free of all other ions, can then be employed as such or the hydrazine perchlorate salt can be isolated from it. As above pointed out, in accordance with this invention the organic solvent will not be completely removed from the salt, but instead the salt will be kept wet with it so that its impact sensitivity is sufficiently reduced as to make its handling less hazardous than handling pure hydrazine perchlorate. Evaporation of the solvent, as for example under reduced pressure, with or without gentle heating, can be employed to remove the major part of the solvent, leaving the damp hydrazine perchlorate or, conveniently, the solution of the perchlorate can simply be chilled to a temperature sufficient to precipitate the hydrazine perchlorate, which can then be separated from the remaining solvent by filtration.

The formation of the hydrazine perchlorate/lithium perchlorate eutectics in accordance with this invention is effected simply by adding the calculated amount of lithium perchlorate, sufficient to form the 1:1 or 1:2 molar ratio eutectic, depending on which is desired, to a solution of hydrazine perchlorate. The ratios of the hydrazine perchlorate and lithium perchlorate in the solution should approximate the ratios corresponding to the eutectics: 44.54 parts lithium perchlorate to 55.46 parts hydrazine perchlorate for the 1:1 molar ratio and 38.4 parts hydrazine perchlorate to 61.6 parts lithium perchlorate for the 1:2 molar ratio (by weight). A volume of solvent will be used sufficient to dissolve all of the reaction mixture components. No particular advantage is gained by varying the temperature or pressure from ambient atmospheric conditions, although gentle heating can be applied if desired as for example to increase the solubility of the materials, employing a temperature such as one below 100° C. and preferably not above about 50° C.

Most advantageously, in forming the eutectics, the hydrazine perchlorate will be made in organic solution and kept in the solution in which it is formed. Sometimes, however, it may be desirable to make it in one organic solvent, remove part of this solvent, and then associate it with anhydrous lithium perchlorate in a different organic solvent. In general, useful solvents for forming the eutectic will be selected from the same group of polar organic solvents as those named above as useful for making hydrazine perchlorate. The low boiling lower aliphatic alcohols such as methyl, ethyl and isopropyl alcohols are preferred.

The eutectics formed in solution will be isolated by removing the solvent under reduced pressure. Heating may be employed to assist in driving off the solvent, and in such a case temperatures employed will desirably be below about 100° and more desirably be not higher than about 50° C. Still more preferably, to avoid the hazard of heating explosive materials, the solvent will simply be drawn off by reducing the pressure to a point at which it will boil at room temperature or below.

The invention is illustrated but not limited by the following examples.

EXAMPLE 1

This example illustrates preparation of hydrazine perchlorate in the anhydrous form in an organic solvent.

A mixture of 4.20 grams (g.) of barium perchlorate and 1.73 g. of hydrazine monohydrochloride in 75 milliliters (ml.) of isopropanol is stirred at about 40° C. for about 30 minutes. While the hydrochloride does not completely dissolve, barium chloride is precipitated. The solids are separated by filtration and the filtrate is cooled in a bath of acetone and solid carbon dioxide. Hydrazine perchlorate precipitates out of the solution as the anhydrous product.

EXAMPLE 2

This example illustrates the preparation of hydrazine perchlorate in solution and the lowered impact sensitivity of the product.

To a solution of 12.6 g. of barium perchlorate in 300 ml. of isopropanol is added 5.19 g. of hydrazine hydrochloride. The mixture is stirred vigorously at room temperature for twenty-four hours. At the end of this time nearly all the hydrazine monohydrochloride has dissolved and a large amount of barium chloride has precipitated. The reaction mixture is filtered twice through a Buchner funnel. When the clear filtrate is placed in a bath of acetone and solid carbon dioxide, hydrazine perchlorate precipitates out almost immediately as a white solid. It is filtered off from the supernatant liquor on a Buchner funnel and the impact sensitivity is immediately measured. The value found (2 kilogram weight, standard Bureau of Mines impact test apparatus, 50% probability height) is 90 cm. The product is then dried under vacuum for 1 hour at 40° C. The impact sensitivity of the dried material corresponds to that for pure hydrazine perchlorate: 7.0 cm. The melting point of the dried product is 135–141° C. (reported M.P., 139–141° C.).

EXAMPLE 3

This example illustrates preparation of hydrazine perchlorate in a different solvent.

Addition of 12.70 g. of barium perchlorate to a solution of 5.17 g. of hydrazine hydrochloride in 300 ml. methanol at room temperature forms a clear solution upon mixing. The solution is stirred at room temperature for several hours. A fine white solid precipitates out and is removed by centrifuging. When the supernatant liquor is placed in a bath of acetone and solid carbon dioxide, addition of 150 ml. of isopropanol produces partial precipitation of the hydrazine perchlorate from the solution. Addition of more isopropanol (200 ml.) while chilling is continued produces further precipitation of the perchlorate.

EXAMPLE 4

This example illustrates another preparation of hydrazine perchlorate and measurement of its sensitivity with and without wetting with alcohol.

Addition of 12.70 g. of barium perchlorate to a mixture of 5.17 g. of hydrazine monohydrochloride in 300 ml. of isopropanol produces immediate cloudiness in the solution. The reaction mixture is vigorously stirred for three hours at room temperature and then centrifuged to remove the barium chloride byproduct. The barium chloride is dried at 120° C. and weighed: 7.24 g. are recovered, which corresponds to a conversion of above 90%.

The supernatant liquid from the centrifuging is chilled in a bath of acetone and solid carbon dioxide. The white precipitate which separates is filtered off and the impact sensitivity immediately measured, using the Bureau of Mines test. The value found is in the 80–100 cm. range. After standing for 2 days, during which some evaporation occurs, the impact sensitivity of the product is 20.4 cm. (50% probability, minimum shot height 20.9 cm.). The hydrazine perchlorate product is now dried under vacuum for 2 hours at 40° C. The impact sensitivity of the alcohol-free product is measured at 7.0 cm. (50% probability).

EXAMPLE 5

This example illustrates the variation in impact sensitivity produced by different degrees of wetting of the hydrazine perchlorate when the different samples are each freshly prepared.

A mixture of 6.35 g. of anhydrous barium perchlorate and 2.59 g. of hydrazine hydrochloride with 50 ml. of isopropanol is stirred vigorously overnight. The next day, when no trace of insoluble hydrochloride can be seen (barium chloride is a fine white powder and thus distinguishable from hydrazine hydrochloride, which is a pale crystalline material) the filtrate is separated by centrifuging and the solids are washed twice with 50 ml. each time of methanol. The original filtrate and the two wash liquors are cooled in baths of acetone and solid carbon monoxide and filtered through a Buchner funnel under a water aspirator pressure. The precipitate from the original filtrate is allowed to suck dry on the Buchner for 15 minutes. The first wash liquor precipitate is allowed to suck dry for 5 minutes. The precipitate from the second wash filtrate, which is small in amount, is removed from the funnel almost immediately. The impact sensitivities of each of these three samples are measured immediately after their removal from the funnel. The 50% probability height for the first is 9.7 cm., for the second 6.9 cm., while for the third it is 41.0 cm.

The washed barium chloride removed from the reaction mixture is dried for two hours at 115° and weighed.

The weight of the recovered barium chloride is 8.64 g., which corresponds to 92.6% conversion. The three precipitates of hydrazine perchlorate are combined and dried in vacuum at 50° C. for 2 hours. The weight of final product is 3.61 g., which corresponds to about a 72% yield.

EXAMPLE 6

This example illustrates the preparation of the 1:1 eutectic in solution.

Hydrazine perchlorate is prepared in isopropanol solution as described in the foregoing examples, and a molar equivalent amount of lithium perchlorate is dissolved in the resulting solution. Chilling in an ice bath is found to provide a mixture of hydrazine perchlorate and lithium perchlorate which does not correspond to the desired 1:1 molar ratio present in the solution.

The 1:1 eutectic is successfully prepared by the following procedure. A solution of 6.35 g. of barium perchlorate in 50 ml. of isopropanol is added to a mixture of 2.59 g. of hydrazine monohydrochloride and 100 ml. of isopropanol. The resulting mixture is stirred vigorously at about 50° C. for several hours. Barium chloride formed in the reaction is removed by centrifuging and decanting the supernatant liquid. The barium chloride is dried under vacuum and weighed: the weight found corresponds to a 99.4% conversion. The filtrate should accordingly contain very close to the theoretical amount of hydrazine perchlorate: 0.038 mole. Thus 4.0 g. (0.038 mole) of dry lithium perchlorate is added to the filtrate. The isopropanol solvent is then removed by vacuum evaporation, employing a water aspirator coupled with a solid carbon dioxide trap for the initial stripping. The product from this stage weighs 5.75 g. After being held overnight at room temperature under a vacuum of 1 mm. Hg, the product weighs 4.51 g., corresponding to a 90% yield. The 50% probability impact sensitivity value is above the capacity of the test equipment; two detonations were achieved at 120 cm.

EXAMPLE 7

This example illustrates another preparation of the eutectic, in which the hydrazine perchlorate is never isolated from solution.

A mixture of 31.75 g. of barium perchlorate in 160 ml. of isopropanol and 12.95 g. of hydrazine monochloride in 310 ml. isopropanol is stirred vigorously while it is heated at 50–60° C. for several hours. The barium chloride precipitate is removed by centrifuging and decanting. The product is a solution of hydrazine perchlorate which is close to saturation: on standing overnight some crystals appear which on removal and air drying melt sharply at 141–142° C. To the solution of hydrazine perchlorate and alcohol is added 20 g. of lithium perchlorate. This dissolves to provide a clear solution from which the solvent is stripped at 60° C. and 1 mm. Hg. Impact tests made before complete drying give a 50% probability height of 53.4 cm.; after drying, 34.8 cm.

Proceeding similarly, but introducing 40 g. of lithium perchlorate, evaporation provides the 1:2 molar ratio eutectic. This eutectic has a dry impact sensitivity of about 50 cm.

EXAMPLE 8

This example illustrates another preparation of the eutectic.

The procedure described in the preceding example, wherein barium perchlorate and hydrazine monochloride are combined in isopropanol, is repeated except that 150 ml. and 300 ml. respectively are used to dissolve the barium perchlorate and hydrazine monohydrochloride. After 4 hours stirring at 50–60° C., the precipitated barium chloride is separated by centrifuging and washed twice with about 100 ml. each time of isopropanol, with stirring and heating during the washing. 20 g. of lithium perchlorate are added to the combined filtrate and wash liquors and the resulting solution is evaporated to dryness in the rotary evaporator at 60° C. under reduced pressure corresponding to about 0.5 mm. Hg. After drying for one hour at 60° C. and 0.5 mm. Hg, the eutectic has an impact sensitivity of 27.0 cm. (50% probability). The measured impact sensitivity of the eutectic combined with 10% of the alcohol is 30.9 cm.

EXAMPLE 9

This example illustrates preparation of the eutectic in a different solvent.

Addition of 3.75 g. barium perchlorate and 12.95 g. of hydrazine monohydrochloride to 300 ml. of ethanol is followed by vigorous stirring at near reflux temperature for 4 hours. The barium chloride precipitate is separated by centrifuging. It is washed once with 150 ml. of methanol and the wash liquor is combined with the original decanted supernatant liquor. 20 g. of lithium perchlorate are added to the resulting solution of hydrazine perchlorate and the solution is evaporated to dryness. The 50% probability height for the dried product is 21.8 cm. Repetition of the preparation giving a product with a 50% probability height of 32.7 cm. shows a chloride content by elemental analysis of 0.55%, total chloride 30.00, 30.03%, perchlorate content 82.60, 82.69% (83.7% theoretical) 0.28, 0.29% barium.

The X-ray diffraction patterns of this product, the product of the preceding example and the 1:1 molar ratio eutectic prepared by fusion are essentially the same. Comparison of these X-ray diffraction patterns with those of lithium perchlorate and hydrazine perchlorate show that they are mixtures rather than true double salts.

A comparison of the 1:1 eutectic prepared as stated with that prepared by the fusion method and with a physical mixture of the same composition gives the following results:

| | Fusion [1] | Solution [2] | Physical mixture [3] |
|---|---|---|---|
| M.P., ° C° | 103–115 | 94–100 | 140 |
| Impact sensitivity, cm.[4] | 31 | 31 | 16 |
| Minimum height for detonation, cm. | 27 | 26 | 15 |

[1] Five sample average.
[2] Three sample average.
[3] Two sample average.
[4] 50% probability, 2 kg. weight.

While the invention has been illustrated with reference to various specific individual embodiments thereof, it is to be appreciated that modification and variation can be made without departing from the scope of the invention, which is limited only as defined in the appended claims.

What is claimed is:

1. The method of preparing and handling hydrazine perchlorate as an anhydrous material which comprises metathesizing a salt of hydrazine with a metal perchlorate salt in an inert polar organic solvent, and maintaining such organic solvent associated with said hydrazine perchlorate during subsequent handling.

2. The method of claim 1 wherein said organic solvent comprises a lower aliphatic alcohol.

3. The method of claim 2 wherein said organic solvent is a mixture of lower aliphatic alcohols.

4. The method of claim 1 wherein the product of reaction of the anion of the initial hydrazine salt and the cation of the initial metal perchlorate salt is substantially insoluble in said solvent.

5. The method of preparing and handling hydrazine perchlorate which comprises metathesizing hydrazine monohydrochloride with barium perchlorate in a lower aliphatic alcohol, separating byproduct barium chloride from the resulting reaction product, and maintaining the resulting hydrazine perchlorate associated with said solvent during its subsequent handling.

6. The method of preparing a lithium perchlorate/hydrazine perchlorate eutectic which comprises adding lithium perchlorate to a solution of hydrazine perchlorate in an inert polar organic solvent, in an amount calculated to supply from 1 to 2 moles of lithium perchlorate per mole of hydrazine perchlorate, and thereafter removing said solvent by evaporation to leave a residue comprising a eutectic of lithium perchlorate with hydrazine perchlorate selected from the 1:1 to 1:2 molar ratio eutectics.

7. The method of providing a perchlorate eutectic having a 50% probability impact sensitivity of at least about 25 cm., without formation, isolation or handling of products having an impact sensitivity less than 10 cm., which comprises forming a solution of hydrazine perchlorate in an organic solvent by metathesizing a hydrazine salt with a metal perchlorate in an inert polar organic solvent, removing byproduct metal salt to leave a substantially pure solution of hydrazine perchlorate in such organic solvent, adding an amount of lithium perchlorate to said solution sufficient to supply from 1 to 2 moles per mole of hydrazine perchlorate present in said solution, and removing said solvent by evaporation to provide a eutectic of hydrazine perchlorate with lithium perchlorate selected from the 1:1 and 1:2 molar ratio eutectics.

8. The method which comprises forming a solution of hydrazine perchlorate by metathesizing hydrazine monohydrochloride with barium perchlorate in a lower aliphatic alcohol solvent, removing byproduct barium chloride, adding from 1 to 2 moles of lithium perchlorate per mole of hydrazine perchlorate to the separated hydrazine perchlorate solution, and stripping off said aliphatic alcohol solvent to provide a eutectic of hydrazine perchlorate and lithium perchlorate selected from the 1:1 to 1:2 molar ratio eutectic.

References Cited
UNITED STATES PATENTS 3,138,498  6/1964  Rausch _____ 23—85 X
3,436,172  4/1969  Paustian et al. _____ 23—85

LELAND A. SEBASTIAN, Primary Examiner

U.S. Cl. X.R.

23—85